United States Patent [19]
Chung

[11] Patent Number: 5,940,597
[45] Date of Patent: Aug. 17, 1999

[54] METHOD AND APPARATUS FOR PERIODICALLY UPDATING ENTRIES IN A CONTENT ADDRESSABLE MEMORY

[75] Inventor: David H. Chung, Sunnyvale, Calif.

[73] Assignees: Sony Corporation, Tokyo, Japan; Sony Electronics, Inc., Park Ridge, N.J.

[21] Appl. No.: 08/947,081

[22] Filed: Oct. 8, 1997

Related U.S. Application Data

[63] Continuation-in-part of application No. 08/590,125, Jan. 23, 1996, Pat. No. 5,764,895, and application No. 08/371,499, Jan. 11, 1995, Pat. No. 5,857,075
[60] Provisional application No. 60/059,171, Sep. 17, 1997.

[51] Int. Cl.$^6$ .................................................. G06F 12/00
[52] U.S. Cl. ....................................... 395/200.72; 711/149
[58] Field of Search ....................... 395/200.72; 711/149, 711/108, 170, 104, 221

[56] References Cited

U.S. PATENT DOCUMENTS

| | | | |
|---|---|---|---|
| H586 | 2/1989 | Kun | 370/94 |
| Re. 33,426 | 11/1990 | Sugimoto et al. | 370/85.14 |
| 3,735,357 | 5/1973 | Maholic et al. | 340/172.5 |
| 4,213,201 | 7/1980 | Gagnier et al. | 370/62 |
| 4,589,120 | 5/1986 | Mendala | 375/117 |

(List continued on next page.)

FOREIGN PATENT DOCUMENTS

| | | | |
|---|---|---|---|
| 0 642 246 A2 | 3/1995 | European Pat. Off. | H04L 29/06 |
| 0785698 A2 | 7/1997 | European Pat. Off. | H04Q 11/04 |
| 0597789 A1 | 5/1999 | European Pat. Off. | H04L 12/46 |
| WO 96/13922 | 5/1996 | WIPO | H04L 12/44 |
| WO 97/18657 | 5/1997 | WIPO | H04L 12/18 |
| 4,597,078 | 6/1986 | Kempf | 370/94 |
| 4,627,052 | 12/1986 | Hoare et al. | 370/88 |
| 4,706,081 | 11/1987 | Hart et al. | 340/825.03 |
| 4,707,827 | 11/1987 | Bione et al. | 370/85 |

OTHER PUBLICATIONS

National Semiconductor, databook, "DP83934 SONIC™-T Systems-Oriented Network Interface Controller with Twisted Pair Interface" pp. 1-457 -8, 1-468 -77, 1-480, .1-512, 1-527 -9.

William Stallings, "Internetworking: A Guide for the Perplexed," Telecommunications, North American Edition, vol. 23, No. 9, Sep. 1989, pp. 25-26, 28, and 30.

Bob Stewart and Bill Hawe, "Local Area Network Applications," Telecommunications, North American Edition, vol. 18, No. 9, Sep. 1984, pp. 96f, 96h, 96j, and 96u.

(List continued on next page.)

*Primary Examiner*—Eric Coleman
*Attorney, Agent, or Firm*—Haverstock & Owens LLP

[57] ABSTRACT

A technique for periodically updating entries in a look-up table for directing data packets through a multi-port bridge in a local area network. For packets received during a first period, the number of the port receiving the packet is stored with the address of the node which generated the packet in a first memory and in a second memory. During the first period, the first memory is utilized for directing packets through the multi-port bridge. At the end of the first period, a third memory is cleared. For packets received during a second period, the number of the port receiving the packet is stored with the address of the node which generated the packet in the second memory and in the third memory. During the second period, the second memory is utilized for directing packets through the multi-port bridge. At the end of the second period, the first memory is cleared. For packets received during a third period, the number of the port receiving the packet is stored with the address of the node which generated the packet in the first memory and in the third memory. During the third period, the third memory is utilized for directing packets through the multi-port bridge. At the end of the third period, the second memory is cleared. This sequence is repeated such that no entry more than two periods old is utilized for directing a packet through the multi-port bridge, however, the age of each entry is not tracked.

37 Claims, 9 Drawing Sheets

U.S. PATENT DOCUMENTS

| | | | |
|---|---|---|---|
| 4,715,030 | 12/1987 | Koch et al. | 370/85 |
| 4,718,060 | 1/1988 | Oguchi et al. | 370/85 |
| 4,723,311 | 2/1988 | Moustakas et al. | 455/612 |
| 4,727,537 | 2/1988 | Nichols | 370/85 |
| 4,727,538 | 2/1988 | Furchtgott et al. | 370/85 |
| 4,737,953 | 4/1988 | Koch et al. | 370/94 |
| 4,744,078 | 5/1988 | Kowalczyk | 370/85 |
| 4,797,879 | 1/1989 | Habbab et al. | 370/3 |
| 4,823,338 | 4/1989 | Chan et al. | 370/85 |
| 4,849,962 | 7/1989 | Morimoto et al. | 370/29 |
| 4,878,216 | 10/1989 | Yunoki | 370/60 |
| 4,901,308 | 2/1990 | Deschaine | 370/58.1 |
| 4,905,219 | 2/1990 | Barr et al. | 370/4 |
| 4,933,937 | 6/1990 | Konishi | 370/85.13 |
| 4,935,922 | 6/1990 | Wicklund et al. | 370/60 |
| 5,016,159 | 5/1991 | Maruyama | 364/200 |
| 5,020,052 | 5/1991 | DePrycker et al. | 370/60 |
| 5,048,014 | 9/1991 | Fischer | 370/85.5 |
| 5,107,489 | 4/1992 | Brown et al. | 370/58.2 |
| 5,119,367 | 6/1992 | Kawakatsu et al. | 370/54 |
| 5,140,585 | 8/1992 | Tomikawa | 370/60.1 |
| 5,151,897 | 9/1992 | Suzuki | 370/85.13 |
| 5,151,994 | 9/1992 | Wille et al. | 395/800 |
| 5,166,926 | 11/1992 | Cisneros et al. | 370/60 |
| 5,184,346 | 2/1993 | Kozaki et al. | 370/60 |
| 5,241,550 | 8/1993 | Kusano | 371/71 |
| 5,243,699 | 9/1993 | Nickolls et al. | 395/275 |
| 5,274,631 | 12/1993 | Bhardwaj | 370/60 |
| 5,379,289 | 1/1995 | DeSouza et al. | 370/85.13 |
| 5,379,296 | 1/1995 | Johnson et al. | 370/60 |
| 5,386,413 | 1/1995 | McAuley et al. | 370/54 |
| 5,404,459 | 4/1995 | Gulick et al. | 395/275 |
| 5,430,762 | 7/1995 | Vijeh et al. | 375/211 |
| 5,432,511 | 7/1995 | Sadjadian et al. | 341/61 |
| 5,434,861 | 7/1995 | Pritty et al. | 370/85.8 |
| 5,442,578 | 8/1995 | Hattori | 364/746.1 |
| 5,446,726 | 8/1995 | Rostaker et al. | 370/17 |
| 5,448,565 | 9/1995 | Chang | 370/85.13 |
| 5,457,446 | 10/1995 | Yamamoto | 340/825.24 |
| 5,457,679 | 10/1995 | Eng et al. | 370/16 |
| 5,481,540 | 1/1996 | Huang | 370/85.13 |
| 5,487,067 | 1/1996 | Matsushige | 370/85.7 |
| 5,502,748 | 3/1996 | Wilkinson | 375/354 |
| 5,506,902 | 4/1996 | Kubota | 380/9 |
| 5,521,913 | 5/1996 | Gridley | 370/58.2 |
| 5,522,059 | 5/1996 | Marushima | 395/476 |
| 5,530,434 | 6/1996 | Kanda | 340/825.04 |
| 5,541,923 | 7/1996 | Kato | 370/85.1 |
| 5,550,826 | 8/1996 | Tanaka et al. | 370/85.5 |
| 5,560,038 | 9/1996 | Haddock | 395/800 |
| 5,565,929 | 10/1996 | Tanaka | 348/565 |
| 5,568,476 | 10/1996 | Sherer et al. | 370/60 |
| 5,568,643 | 10/1996 | Tanaka | 395/739 |
| 5,570,330 | 10/1996 | Okawa | 369/44.32 |
| 5,570,466 | 10/1996 | Oechsle | 395/200.15 |
| 5,598,161 | 1/1997 | Yamada | 341/159 |
| 5,598,278 | 1/1997 | Tanaka et al. | 386/96 |
| 5,598,391 | 1/1997 | Mukawa | 369/54 |
| 5,600,664 | 2/1997 | Hayashi | 371/43 |
| 5,602,851 | 2/1997 | Terashita et al. | 370/403 |
| 5,608,730 | 3/1997 | Osakabe et al. | 370/471 |
| 5,608,879 | 3/1997 | Cooke | 395/290 |
| 5,621,725 | 4/1997 | Kawamura et al. | 370/43 |
| 5,640,399 | 6/1997 | Rostoker | 370/392 |
| 5,761,435 | 6/1998 | Fukuda et al. | 395/200.68 |
| 5,802,047 | 9/1998 | Kinoshita | 370/359 |

OTHER PUBLICATIONS

Bob Stewart, Bill Hawe, and Alan Kirby, "Local Area Network Connection," Telecommunications, North American Edition, vol. 18, No. 4, Apr. 1984, pp. 54–55,58–59 and 66.

Printout of internet website http://www.ti.com/sc/docs/network/tswitch/product.htm#3150al, ThunderSWITCH Product Information, "ThunderSWITCH Product Description," Feb. 1997.

Texas Instruments Product Preview SPWS027, "TNETX3150 ThunderSWITCH™ 15–Port 10–/100–MBIT/S Ethernet™ Switch," pp. 1–85, Sep. 1996.

Triplet

| Source Port Identification 400 | Dest. Port Identification 402 | Memory Address 404 |

Fig. 7

METHOD AND APPARATUS FOR PERIODICALLY UPDATING ENTRIES IN A CONTENT ADDRESSABLE MEMORY

This is a continuation-in-part of U.S. patent application Ser. No. 08/590,125, now U.S. Pat. No. 5,764,895, filed on Jan. 23, 1996, and a continuation-in-part of U.S. patent application Ser. No. 08/371,499, filed on Jan. 11, 1995. The contents of U.S. patent application Ser. No. 08/590,125 and the contents of U.S. patent application Ser. No. 08/371,499, now U.S. Pat. No. 5,857,075, are hereby incorporated by reference. This application claims the benefit of U.S. Provisional Application Ser. No. 60/059,171, filed Sep. 17, 1997, entitled, "MULTI-PORT BRIDGE FOR A LOCAL AREA NETWORK."

FIELD OF THE INVENTION

The invention relates to the field of look-up tables for appropriately directing data packets through a multi-port bridge in a local area network. More particularly, the invention relates to the field of periodically updating entries in a look-up table for appropriately directing data packets through a multi-port bridge in a local area network where the look-up table is a random access memory (RAM) device which is configured to emulate a content addressable memory (CAM) device.

BACKGROUND OF THE INVENTION

Random access memory (RAM) devices generally comprise a plurality of data storage locations, each data storage location having a corresponding predetermined address. FIG. 1 illustrates a conventional RAM device 10. As illustrated in FIG. 1, the RAM device 10 has address fields that are each eight bits in length. Accordingly, the RAM device 10 has 256 unique addresses. Because there is a one-to-one correspondence of addresses to data storage locations, there are 256 data storage locations (fields) in the RAM device 10. The RAM device 10, however, could have other address field lengths and, thus, a different number of unique addresses and corresponding storage locations.

The RAM device 10 includes an address port 12, a data port 14 and a read/write control input 16. To store data in a data storage location of the RAM device 10, the address of the location in which the data is to be stored is applied to the address port 12 and the data to be stored is applied to the data port 14. Then, the read/write control input 16 is conditioned to write the data into the location specified by the address. To read data from the RAM device 10, the read/write control input 16 is conditioned to read data and the address of the location from which the data is to be read from is applied to the address port 12. The data stored in the location specified by the address appears at the data port 14.

Content addressable memory (CAM) devices generally comprise a plurality of data storage locations, each data storage location having a predetermined corresponding address. CAM devices are characterized in that each data storage location includes a comparand field and an associated data field. Comparands are stored in the comparand fields, while data associated with each comparand is stored in the associated data field. Data from the associated data fields is read by comparing each comparand to an applied value. When a match occurs, the contents of the associated data field corresponding to the matching comparand are read.

FIG. 2 illustrates a conventional CAM device 20. As illustrated in FIG. 2, the CAM device 20 has address fields that are each eight bits in length. Accordingly, the CAM device 20 has 256 unique addresses. Because there is a one-to-one correspondence of addresses to data storage locations, there are 256 data storage locations in the CAM device 20, each data storage location including a comparand field and an associated data field. The CAM device 20, however, could have other address field lengths and, thus, a different number of unique addresses and corresponding storage locations.

The CAM device 20 includes an address port 22, a comparand port 24, an associated data port 26, a read/write control input 28 and a match output 29. To store a comparand and associated data in the CAM device 20, a desired address is applied to the address port 22, the desired comparand is applied to the comparand port 24 and the desired associated data is applied to the associated data port 26. Then, the control input 28 is conditioned to write the comparand and the associated data into the location specified by the address.

To read associated data from the CAM device 20, the control input is conditioned to read data and a specified value is applied to the comparand port 24. If a stored comparand matches the specified value applied to the comparand port 24, this condition will be indicated by the match output 29. Data stored in the associated data field which corresponds to the matching comparand appears at the associated data port 26. Otherwise, if no comparand matches the value applied to the comparand port 24, the match output 29 will indicate this condition.

Therefore, to read associated data from the CAM device 20, the value applied to the comparand port 24 is compared to the previously stored contents of all the comparand fields. When a match is found, the associated data appears at the data port 26. Accordingly, the memory device 20 is referred to as "content addressable."

Because of this "content addressable" feature, CAM devices are typically more expensive to manufacture and to purchase than RAM devices, however, CAM devices are particularly well suited for certain applications. For example, a CAM device can be utilized to construct a look-up table for appropriately directing data packets through a multi-port bridge in a local area network (LAN). FIG. 3 illustrates a conventional local area network including a multi-port bridge 30. The multi-port bridge 30 has eight ports #A–F, though the number of ports can vary. Each port #A–F is connected to a segment 31–38 of the LAN. Each segment 31–38 typically includes one or more nodes 39–54, such as a workstation, a personal computer, a data terminal, a file server, a printer, a facsimile, a scanner or other conventional digital device. Each of the nodes 39–54 has an associated node address which uniquely identifies the node. The nodes 39–54 are configured to send data, one to another, in the form of discrete data packets.

When the LAN operates according to Ethernet standards, such as the Institute of Electrical and Electronics Engineers (IEEE) 802.3 standard, data is communicated in the form of discrete packets. FIG. 4 illustrates a conventional IEEE 802.3 data packet 60. The data packet 60 includes an eight byte long pre-amble 61 which is generally utilized for synchronizing a receiver to the data packet 60. The pre-amble 61 includes seven bytes of preamble and one byte of start-of-frame. Following the pre-amble 61, the data packet 60 includes a six-byte-long destination address 62, which is the node address of a node which is an intended recipient for the data packet 60. Next, the data packet 60 includes a six-byte-long source address 63, which is the node address of a node which originated the data packet 60. Following the source address 63 is a two-byte length field 64. Following the length field 64 is a data field 65. The data field 65 can be up to 1500 bytes long. Finally, the data packet 60 includes a two-byte frame check field 66 which allows a recipient of the data packet 60 to determine whether an error has occurred during transmission of the data packet 60.

When a node (source node) sends data to another node (destination node) located on its same segment of the LAN (intra-segment communication), the data is communicated directly between the nodes without intervention by the multi-port bridge 30 and is known as an intra-segment packet. Therefore, when the multi-port bridge 30 receives an intra-segment packet, the multi-port bridge 30 does not bridge the packet (the packet is filtered). When a node (source node) sends a data packet to another node (destination node) located on a different segment (inter-segment communication), the multi-port bridge 30 appropriately forwards the data packet to the destination node.

The multi-port bridge 30 (FIG. 3) receives each data packet 60 (FIG. 4) and must determine whether the data packet 60 is for intra-segment communication or inter-segment communication, and if the data packet 60 is for inter-segment communication, the multi-port bridge 30 must determine which port (destination port) the data packet 60 is to be directed based upon the destination address 62 contained in the data packet 60. This can be accomplished with a look-up table constructed in a CAM device 20 (FIG. 2). Conventionally, the look-up table is constructed by executing a learning phase for each received data packet 60 to store data in the table and by executing a look-up phase for each received data packet 60 to look-up data stored during the learning phase for a prior packet.

An example is provided to enhance understanding of the learning phase. To understand the example, one should refer to FIGS. 2, 3 and 4. The learning phase is executed by storing in the address field of the CAM device 20 the address of the node (source node) which sends a data packet 60 and storing in the corresponding data field the number of the port (source port) which received the data packet 60. For example, referring to FIG. 3, if the node 39 sends a data packet 60 to the node 50, the data packet 60 will include the address of the node 39 as its source address. The multi-port bridge 30 will receive the data packet 60 from port #1. Therefore, for the learning phase, the address of the node 39 will be stored in the address field of the CAM device 20 and a number identifying the port #1 will be stored in the corresponding data field. This process is repeated for each data packet 60 received by the multi-port bridge 30.

Once the look-up table is constructed, to appropriately direct a next data packet 60, the destination address contained in the data packet 60 is applied to the address port 22 of the CAM, while the data port 24 of the CAM will indicate to which port (destination port) the packet is to be directed. In the example, the node 50 is the intended recipient. Thus, the data packet will include the address of the node 50 as its destination address The node 50 is connected to the port #6. Therefore, when the address of the node 50 is applied to the address port 22 of the CAM device 20, the data port 24 of the CAM device 20 will indicate that the data packet 60 should be routed to the port #6. Data packets 60 received before the table is completed are broadcast to all the ports #1–8 to ensure that the appropriate destination node receives the packet.

To save costs, the CAM device 20 can be emulated by a RAM device through a technique known as hashing. Hashing is a mathematical technique of mapping a larger set of numbers into a smaller set. For example, in an Ethernet LAN, each node is specified by an address that is six bytes (48 bits long. Therefore, there are $2^{48}$ (approximately 2.8× $10^{14}$) possible addresses. Using a RAM device to store a port number associated with each of these possible addresses would require a RAM device having $2^{48}$ memory locations. Construction of such a large RAM device would tend to be impractical and would almost certainly exceed the cost and space requirements of an appropriately sized CAM device. Because Ethernet LANs generally have far fewer than $2^{48}$ nodes, hashing can be utilized to construct a look-up table having far fewer than $2^{48}$ entries.

According to the IEEE 802.3 standard, a look-up table is required to accurately reflect nodes which have been newly added or removed from the LAN. For this purpose, each node of the LAN periodically transmits a "keep alive" packet, preferably once every 2.5 minutes. Entries in a look-up table which have not been updated within a predetermined time period, preferably five minutes, are removed from the look-up table.

A known technique for updating such a look-up table in an Ethernet LAN includes storing a time stamp in the look-up table along with every entry and updating the time stamp whenever the corresponding node originates a data packet. In addition, the technique requires keeping track of the age of every entry in the look-up table, and when an entry becomes more than five minutes old, removing the entry. This technique has a disadvantage in that a large amount of processing overhead is required to provide a time stamp for each entry in the table, to update the time stamps, to keep track of the time elapsed since a last update for each entry, and to remove entries after five minutes have elapsed since the last update for the entry. Also, additional storage space is required for storing the time stamps.

Therefore, what is needed is an improved technique for periodically updating the entries in a CAM device. What is further needed is an improved technique for periodically updating the entries in a CAM device emulated by a RAM device. What is still further needed in an improved technique for periodically updating the entries in a look-up table utilized for appropriately directing data through a multi-port bridge in an Ethernet LAN.

SUMMARY OF THE INVENTION

The invention is a method of and apparatus for periodically updating entries in a lookup table utilized for appropriately directing data packets through a multi-port bridge in a local area network (LAN) and for ensuring that no entry older than predetermined amount of time is utilized to direct a data packet through the multi-port bridge. Each of the data packets is originated by a respective one of a plurality of nodes of the LAN and contains a source address, which is the address of the node which originated the data packet, and a destination address, which is the address of the node which is intended to receive the data packet. One or more nodes are included in each segment of the LAN and each segment is coupled to a corresponding port of the multi-port bridge. Each node can be a workstation, a personal computer, a data terminal, a file server, a printer, a scanner, a facsimile or other conventional digital device. Each node is identified by a unique node address, while each port is identified by a unique port number.

When a node (source node) in the LAN sends a data packet to another node (destination node) in the LAN, the data packet is received by a port (source port) of the multi-port bridge. A look-up table is used for identifying the location of the destination node. The look-up table is constructed by performing a learning phase for each data packet in which the number of the port (source port) which receives the data packet is stored in association with the source address contained in the data packet. The multi-port bridge performs a look-up cycle upon the destination address contained in the packet to identify the appropriate other port (destination port) for transmitting the data packet to the node which is to receive the data packet. Then, the multi-port bridge directs the data packet to the port indicated (the destination port).

The look-up table comprises a first memory store, a second memory store, and a third memory store. Each memory store is either a CAM device or a RAM device which emulates a CAM device. A learning phase is performed for each data packet received during a first period of time. During the learning phase, the port identification number of the source port is stored in association with the address of the source node in both the first memory store and in the second memory store. This allows rapid correlation of node to port address information. Also, in a look-up cycle for each data packet received during the first period of time, entries in the first memory store are utilized for directing the data packet through the multi-port bridge (determining which is the appropriate destination port for the packet). At the end of the first period of time, the third memory store is cleared of all entries.

In a learning phase for each data packet received during a second period of time, the port identification of the source port is stored in association with the address of the source node in both the second memory store and in the third memory store. Also, in a look-up cycle for each data packet received during the second period of time, the entries in the second memory store are utilized for directing the data packet through the multi-port bridge. At the end of the second period of time, the first memory store is cleared of all entries.

In a learning phase for each data packet received during a third period of time, the port identification number of the source port is stored in association with the address of the source node in both the first memory store and in the third memory store. Also, in a look-up cycle for each data packet received during the third period of time, entries in the third memory store are utilized for directing the data packet through the multi-port bridge. At the end of the third period of time, the second memory store is cleared of all entries.

This sequence is repeated, beginning with the first period of time, so long as the multiport bridge is directing packets. Accordingly, no entry that is more than two time periods old is utilized for directing a data packet through the multi-port bridge. Preferably, the first, second and third time periods are each 2.5 minutes. Therefore, no entry that is more than 5 minutes old is utilized for directing a data packet through the multi-port bridge. Unlike prior systems, the age of each entry in the look-up table need not be individually tracked.

DETAILED DESCRIPTION OF A PREFERRED EMBODIMENT

The following documents are hereby incorporated by reference: U.S. patent application Ser. No. 08/946,866, filed on the same day and having the same assignee as the present application and entitled, "PER-PACKET JAMMING IN A MULTI-PORT BRIDGE FOR A LOCAL AREA NETWORK".

In the preferred embodiment, the present invention is utilized for appropriately directing data packets through a multi-port bridge for an Ethernet LAN. It will be apparent, however, that other devices in an Ethernet LAN, such as a switch or a router, or devices in a network operating according to another networking standard, can utilize the advantages of the present invention.

Figure 5:
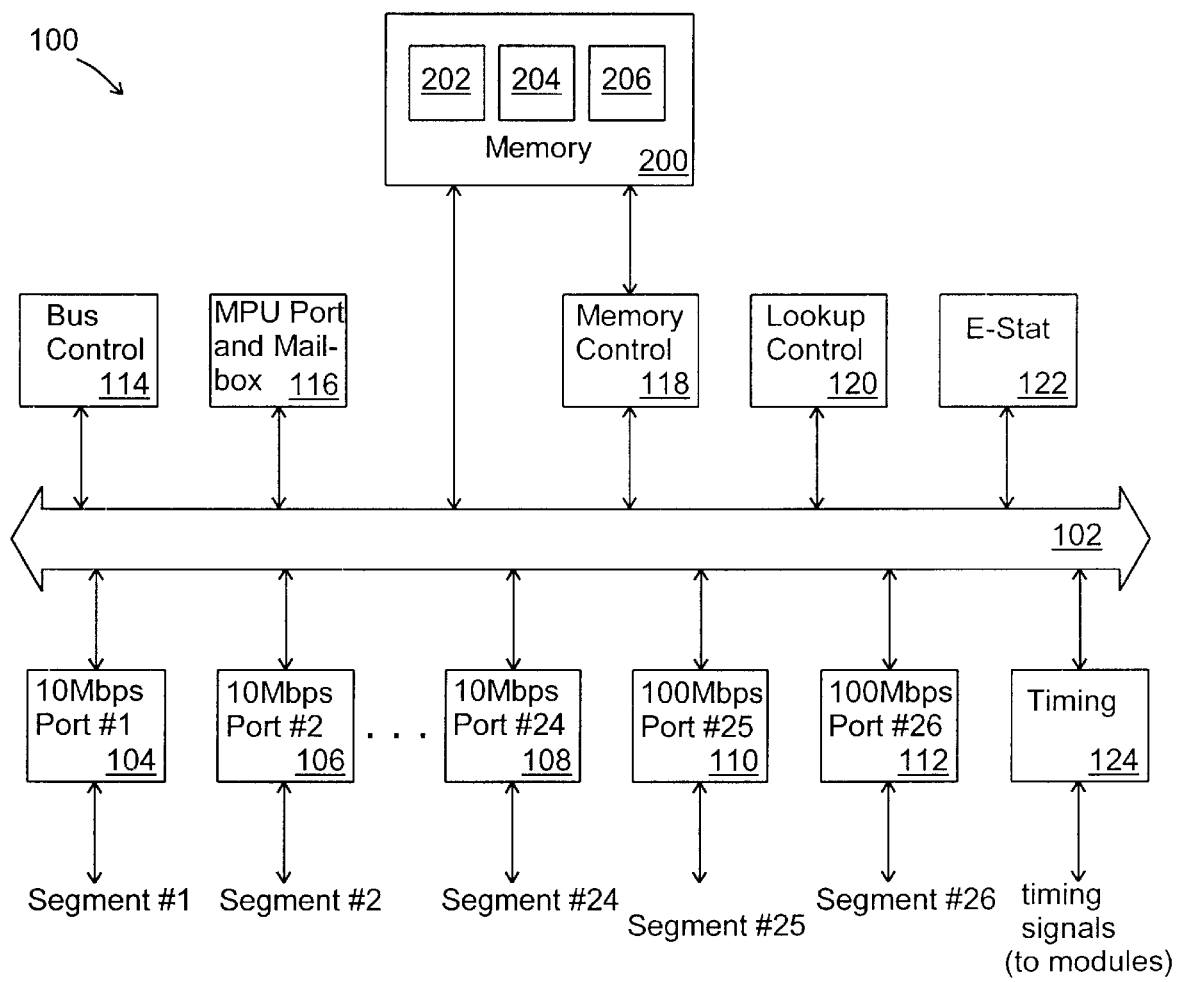
FIG. 5 illustrates a block schematic diagram of a multi-port bridge according to the present invention.

FIG. 5 illustrates a block schematic diagram of a multi-port bridge 100 according to the present invention. A high speed communication bus 102 provides an interconnection for each of the functional blocks 104–124 of the multi-port bridge 100. The communication bus 102 preferably includes five command lines and thirty-two data lines, though it will be apparent that other bus configurations can be utilized. According to the preferred embodiment, twenty-four 10 Mbps ports 104–108 and two 100 Mbps ports 110–112 are each coupled to the communication bus 102 and can be coupled to a respective LAN segment, each LAN segment having one or more nodes. Each of the twenty-four 10 Mbps ports 104–108 transmit and receive data packets at a rate of 10 Mbps, whereas, the two 100 Mbps ports 110–112 transmit and receive data packets at a rate of 100 Mbps. It will be apparent, however, that other numbers of ports, other port configurations and other performance characteristics can be utilized.

A bus control module 114 controls access to the communication bus 102 by collecting requests from the ports 104–112 and from the other modules. Based upon the requests, the bus control module 114 grants access to the communication bus 102 according to an appropriate priority. An MPU port and mailbox module 116 provides an interface between the multi-port bridge 100 and an external processor (not shown) for performing various functions, including loading data into registers of the multi-port bridge 100, fetching data from registers of the multi-port bridge 100 and transferring data packets between the external processor and the ports 104–112 of the multi-port bridge 100.

A memory control module 118 provides an interface between the memory device 200 and the communication bus 102 and also provides an interface between the memory device 200 and a look-up control module 120. The memory device 200 includes mailboxes 202 for exchanging information between the external processor and the multi-port bridge 100. In addition, the memory device includes look-up tables 204. The look-up tables 204 include entries which indicate which port of the multi-port bridge 100 is associated with each node of the LAN. The look-up tables 204 are utilized for appropriately directing among the ports 104–112 data packets received by the multi-port bridge 100, as will be explained in more detail herein.

The look-up control module 120 receives addresses of nodes and associated port identifications to be stored in the look-up table 204 from the communication bus 102. The look-up control module 120 also facilitates utilizing the look-up table 204 for directing packets among the ports 104–112 based upon the destination address of each packet. The memory device 200 also includes packet buffers 206 for temporarily storing data packets that are being directed through the multi-port bridge 100. The memory device 200 is preferably an SDRAM device, though other types of memory devices can be utilized, such as DRAM, RAM or EDO. In the case of dynamic memory, the memory control module 118 refreshes the memory device 200 as required.

An E-stat module 122 collects data packet routing statistics and provides them to the external processor for performing analysis and network management functions. A timing module 124 provides timing signals to the ports 104–112 and to the other modules 114–122 of the multi-port bridge 100. Preferably, a primary clock signal cycles at 40 MHz. Other clock signals, at 10 MHz and 25 MHz, are derived from the primary clock signal.

Preferably, the modules 114–124 are each implemented as a finite state machine, though the modules 114–124 can alternately be implemented as one or more processors operating according to stored software programs. Finite state machines are preferred as they can generally perform the necessary operations faster, thus, resulting in a higher packet handling capacity for the multi-port bridge 100.

Figure 6:
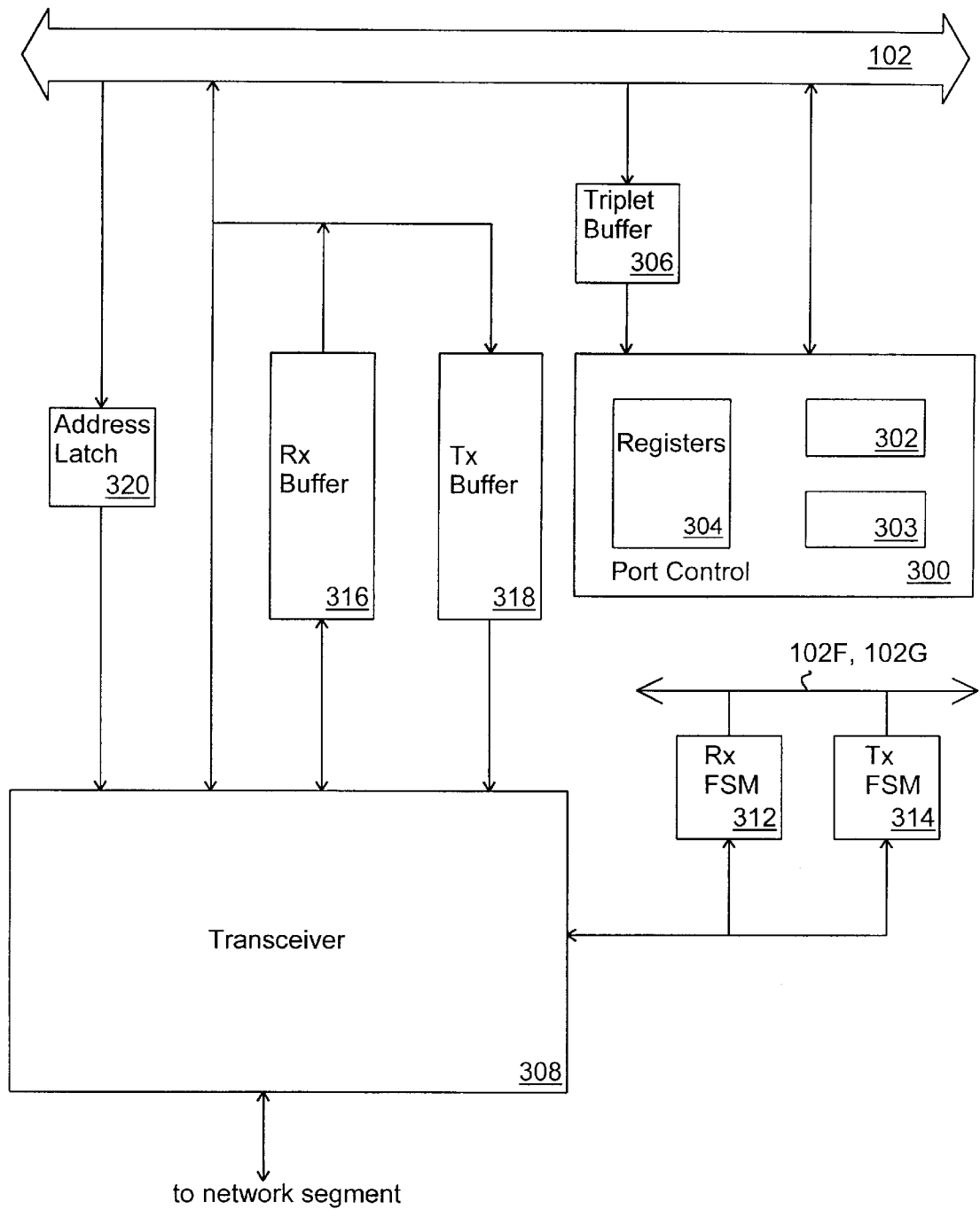
FIG. 6 illustrates a port of the multi-port bridge according to the present invention.

FIG. 6 illustrates a block schematic diagram of one of the ports 104–112 of the multiport bridge 100. A port controller 300, including a bus controller 302 and registers 304, provides control for the port and an interface between the port and the communication bus 102. The port controller 300 monitors the communication bus 102 for commands and data directed to the port and also provides commands to the communication bus 102 at times when the port has control of the communication bus 102. The registers 304 contain data for initializing the port upon start-up and for collecting status information for the port. The port also includes a triplet FIFO buffer 306 coupled between the communication bus 102 and the port controller 300. The triplet buffer 306 stores memory pointers ("triplets"—explained in more detail herein) for data packets being queued in the packet buffers 206 (FIG. 5) of the memory device 200. Preferably, the triplet buffer 306 holds 128 triplets, each triplet preferably being four bytes long.

The port also includes a medium access control (MAC) transceiver 308 which accesses a LAN segment 310 for transmitting and receiving data packets to and from the LAN segment 310. Associated with and coupled to the transceiver 308 are a receive finite state machine 312, for controlling the transceiver 308 during packet reception, and a transmit finite state machine 314, for controlling the transceiver 308 during packet transmission. The receive finite state machine 312 and the transmit finite state machine 314 are each coupled to the bus control module 114 for requesting access to the communication bus 102 therefrom (FIG. 5).

Packets received from the LAN segment 310 by the transceiver 308 are directed to the communication bus 102 through a receive FIFO buffer 316, while packets to be transmitted over the LAN segment 310 are directed from the communication bus 102 to the transceiver 308 through a transmit FIFO buffer 318. Preferably, the receive buffer 316 holds 128 bytes while the transmit buffer 318 holds 256 bytes. Note that an IEEE 802.3 data packet can include up to 1500 bytes of data in addition to the source address, the destination address and the frame check field. Thus, neither the receive buffer 316, nor the transmit buffer 318 is capable of storing a entire IEEE 802.3 data packet of the maximum size. An address latch 320 is also included in the port for latching addresses from the communication bus 102 and providing them to the transceiver 308.

Packet flow through the multi-port bridge occurs in the following manner. A data packet, such as an IEEE 802.3 data packet, originating from a node (source node) in a segment of the local area network is received by a corresponding one of the ports 104–112 (source port) of the switch engine 100 (FIG. 5). The receive buffer 316 in the source port receives the data packet as the packet is being received by the transceiver 308 in the source port from the LAN segment associated with the source port. After the first twelve bytes, corresponding to the source address and the destination address for the packet, are received, the receive finite state machine 312 requests a look-up cycle from the bus control circuit 114 (FIG. 5) by raising an interrupt request line coupled to the bus control module 114. The bus control module 114 monitors such requests and grants each request according to an appropriate priority. Upon granting the request, the bus control module 114 notifies the source port by placing a bit pattern identifying a bus grant on the command lines of the communication bus 102 and a bit pattern uniquely identifying the source port on the data lines of the communication bus 102.

The first four bytes of the destination address for the packet are then placed from the receive buffer 316 of the source port onto the data lines of the communication bus 102, while a corresponding bit pattern is placed on the command lines of the communication bus 102 by the bus controller 302 of the source port. The look-up control module 120 (FIG. 5) receives the first four bytes of the destination address. Then, the source port places the last two bytes of the destination address for the packet and the first two bytes of the source address for the packet on the data lines of the communication bus 102 and places a corresponding bit pattern on the command lines of the communication bus 102. The look-up control module 120 receives these four bytes. Finally, the source port places the last four bytes of the source address for the packet on the data lines of the communication bus 102 and places a corresponding bit pattern on the command lines. The look-up control module 120 also receives these four bytes. Thus, the destination address and source address are transferred over the communication bus 102 in segments that are each four bytes long as this corresponds to the width (32 bits) of the data lines of the communication bus 102. It will be apparent, however, that the communication bus 102 can have a different number of data lines, in which case, a different number of bytes can be transferred at a time.

Once the look-up control module 120 has received the destination address and the source address for the packet, the look-up control module 120 so notifies the memory control module 118 (FIG. 5). The memory control module 118 then updates the look-up tables 204 (FIG. 5) by ensuring that the source address for the packet is stored in the look-up tables 204 in association with the identification of the source port for the packet. This ensures that the look-up tables 204 accurately reflect any changes that may have occurred in the LAN (referred to as a learning phase). The information stored during the learning phase is utilized for directing subsequent packets. Once the learning phase is complete, the memory control 118 module utilizes the look-up tables 204 to determine which port (destination port) is associated with the destination address for the packet.

As a result of performing the look-up cycle, the memory control module 118 forms a bit pattern referred to as a "triplet". FIG. 5 illustrates the triplet which includes three fields: a first field 500 containing the identification of the source port, a second field 502 containing the identification of the destination port, and a third field 504 containing a starting address assigned to the incoming packet in the packet buffers 206 of the memory device 200. The first field 500 and the second field 502 are each preferably one byte long, while the third field 504 is preferably two bytes long. It will be apparent, however, that the ordering of the fields of the triplet and the size of each field can be altered. If the source port and the destination port identified by the triplet are the same, this indicates that the source and destination nodes are on the same segment of the LAN (intra-segment communication) and, therefore, the packet does not need to be bridged. In such case, no further action is taken relative to the packet (the packet is filtered).

Otherwise, the memory control module 118 places the triplet on the data lines of the communication bus 102 and places a bit pattern indicating that an "initial triplet" is ready on the command lines. Each port monitors the communication bus 102. If the port identified as the destination port in the triplet is not currently busy transmitting or receiving another packet, the destination port will configure itself to receive the packet directly from the source port (cut-through). Alternately, if the triplet buffer 306 in the port identified as the destination port in the triplet is nearly full, the bus controller 302 of the destination port applies a jam request signal to the command lines of the high bus 102. The source port will receive the jam request and, in response, will discard the incoming packet and also send a jam packet over its associated segment. The jam packet will cause the node (source node) which is the source of the packet to discontinue sending the packet and attempt to resend the packet after a waiting period.

Once the triplet has been placed on the communication bus 102, the source port initiates a series of memory write cycles for loading the packet from the receive buffer 314 of the source port into the packet buffers 206 in the memory device 200 starting at the memory address identified by the third field of the triplet. Preferably, the packet buffers 206 include a space allocated to each port for storing packets to be transmitted by the port. Alternately, the space is allocated to each port for storing packets received by the port; it should be noted, however, that only one and not both types of allocated space need be provided. Packets are written into the space allocated to the port in the packet buffers 206 in a circular fashion; each new packet will overwrite portions of the oldest packet in the allocated space.

The packet is preferably loaded into the packet buffers 206 a predetermined offset from the assigned address. This provides a location for storing a header for the packet once the packet has been completely loaded into the packet buffers 206. For example, the header can include an identification number assigned to the packet, the triplet for the packet and a receive status for the packet. The receive status indicates whether or not the entire packet has been successfully received and loaded into the packet buffer 206.

Multiple memory write cycles are generally needed to transfer the entire packet into the packet buffers 206 as the remaining portions of the packet will generally include more than thirty-two bits (the number of data lines in the communication bus 102). Writing of the packet in the packet buffers 206 preferably occurs as the remainder of the packet is still being received into the receive buffer 316 of the source port. For this reason, the receive buffer 316 for each port need not be capable of storing an entire data packet. In addition, if the destination port is configured for cut-through, the destination port will receive the packet into its transmit buffer 318 directly from the communication bus 102 simultaneously with the write cycles for loading of the packet into the packet buffers 206. During such a cut-through operation, the packet is received into a transmit buffer 318 of the destination port for immediate transmission to the LAN segment associated with the destination port.

Once the entire packet has been loaded into the packet buffers 206, the memory control module 118 again places the triplet on the data lines of the communication bus 102 and places a bit pattern on the command lines identifying this as the "final triplet." It should be noted that the bit patterns for the initial triplet and for the final triplet are preferably identical, while the bit patterns placed on the command lines of the communication bus 102 for identifying each of the triplets are distinct. The destination port will then store the triplet in the triplet buffer 306 located within the destination port. Thus, the packet is queued for transmission by the destination port.

Then, when the destination port is no longer busy, the destination port will retrieve the packet from the packet buffers 206. This is accomplished by the destination port requesting access to the communication bus 102 from the bus control module 114. When the request is granted, the bus control module 114 places a bit pattern indicating a bus grant on the command lines of the communication bus 102 and a bit pattern identifying the port on the data lines. Once the destination port gains control of the communication bus 102, the destination port then initiates a series of read operations over the communication bus 102 by placing the starting address in the packet buffers 206 of the packet (from the third field of the triplet for the packet) on the data lines of the communication bus 102 and places a bit pattern identifying a memory read operation on the command lines. In response, the memory control module 118 accesses the packet in the packet buffers 206. Preferably, the destination port checks the receive status for the packet. If the receive status indicates that the packet was not received successfully, the memory read operation is preferably halted and no further action is taken relative to the packet.

In addition, in the event that a cut-through operation was initiated, but was unsuccessful, the packet will need to be retransmitted by the destination port. For example, the cut-through operation may have been unsuccessful if a data collision occurred during its transmission over the segment associated with the destination port. In such case, the packet is retrieved from the packet buffers 206 as described above.

While the destination port is receiving the packet into its transmit buffer 316 from the packet buffers 206 or directly from the source port (as during cut-through), the destination port begins transmitting the packet to the LAN segment associated with the destination port under control of the transmit finite state machine 314. For this reason, the transmit buffer 318 for each port need not be capable of storing an entire data packet. The packet is then received from the LAN segment by the destination node for the packet.

It will be apparent that rather than utilizing the packet buffers 206 to store queued packets, the receive buffer 316 and/or transmit buffer 318 of each port can be enlarged to store the entirety of each queued packet. Such an embodiment is less preferred, however, because the performance is likely to be lower, especially if the total storage available for temporarily storing the data packets is reduced. In addition, the inclusion of large buffers in each of the ports complicates the integration of the multi-port bridge 100 into a single integrated circuit (with the memory device 200 being external to the integrated circuit).

Figure 8:
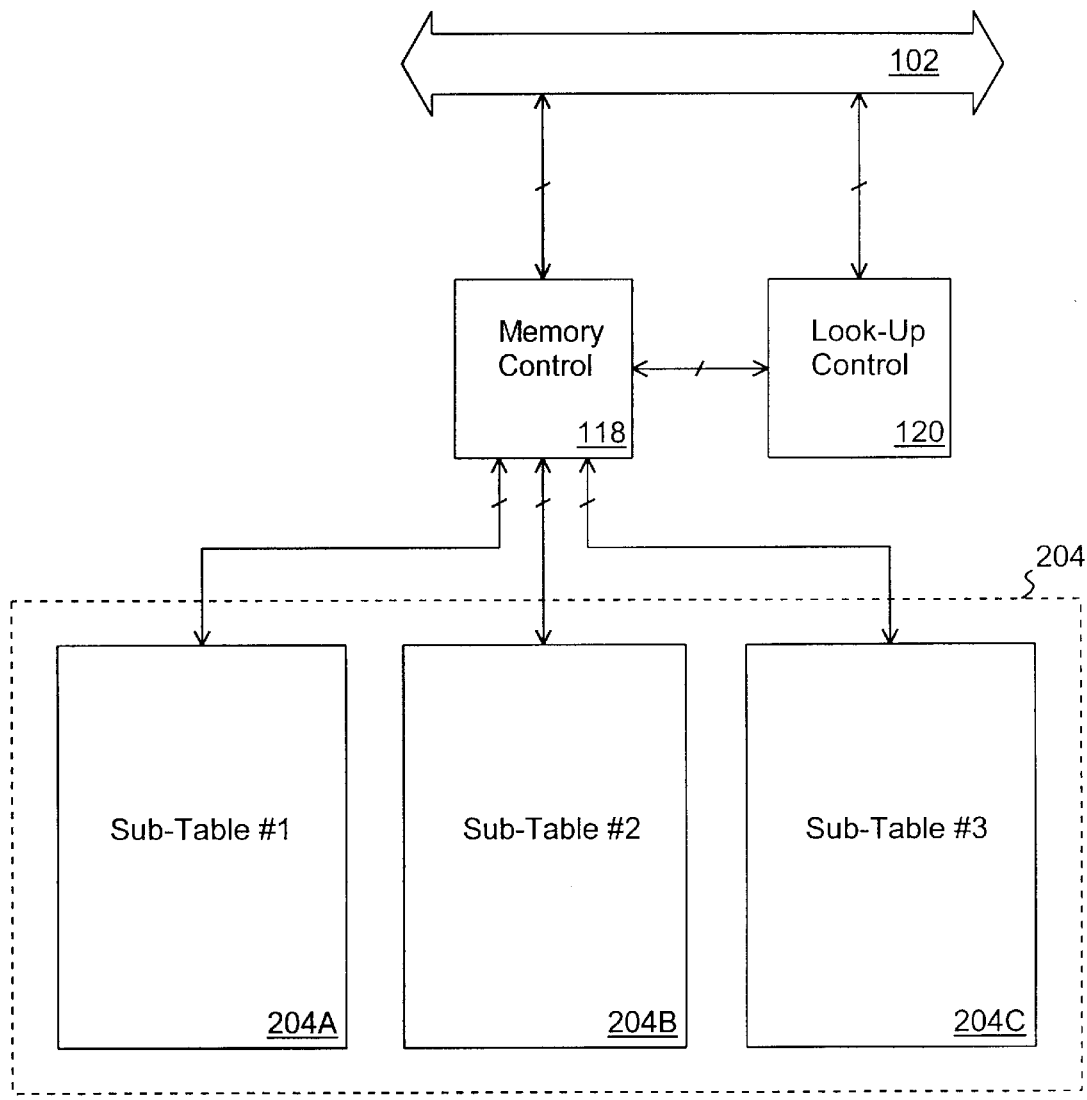
FIG. 8 illustrates a block schematic diagram of an apparatus according to the present invention for periodically updating a look-up table having three look-up sub-tables.

FIG. 8 illustrates a block schematic diagram of an apparatus according to the present invention for periodically updating the look-up tables 204. The look-up tables 204 include three sub-tables 204A–C and are preferably a portion of the memory device 200 (FIG. 5) configured to emulate a CAM device. It will be apparent, however, that the look-up tables 204 could be included in one or more memory devices distinct from the memory device 200. For example, the look-up tables 204 can be one or more CAM devices.

The look-up control module 120 preferably performs a hashing algorithm on each address before the address is stored in the look-up tables 204 along with a corresponding port identification. The hashing algorithm preferably removes the most significant bits of each address and retains the least significant bits unchanged, though other hashing algorithms could be used. Preferably, the sixteen least significant bits are retained such that there are $2^{16}$ (65,536) possible addresses after hashing. Accordingly, each of the sub-tables 204A–C preferably has $2^{16}$ (65,536) memory locations. It will be apparent, however, that the hashing algorithm can result in a different number of remaining bits and, thus, a different number of memory locations in each sub-table.

Figure 9:
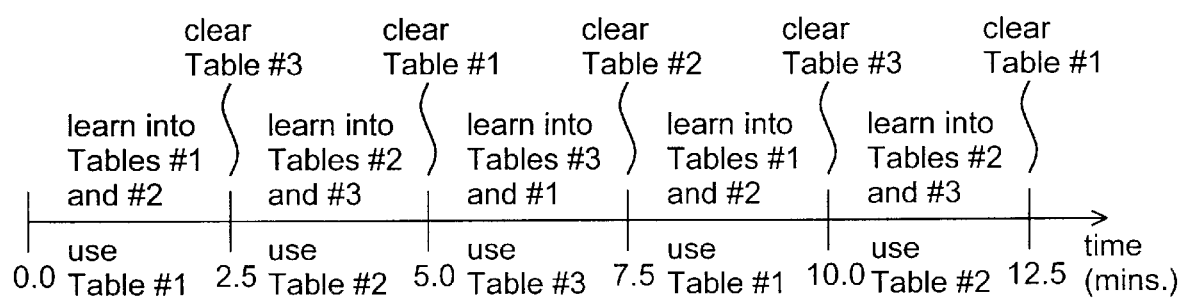
FIG. 9 illustrates a time chart according to the present invention for periodically updating the three look-up sub-tables illustrated in FIG. 8.
Figure 3:
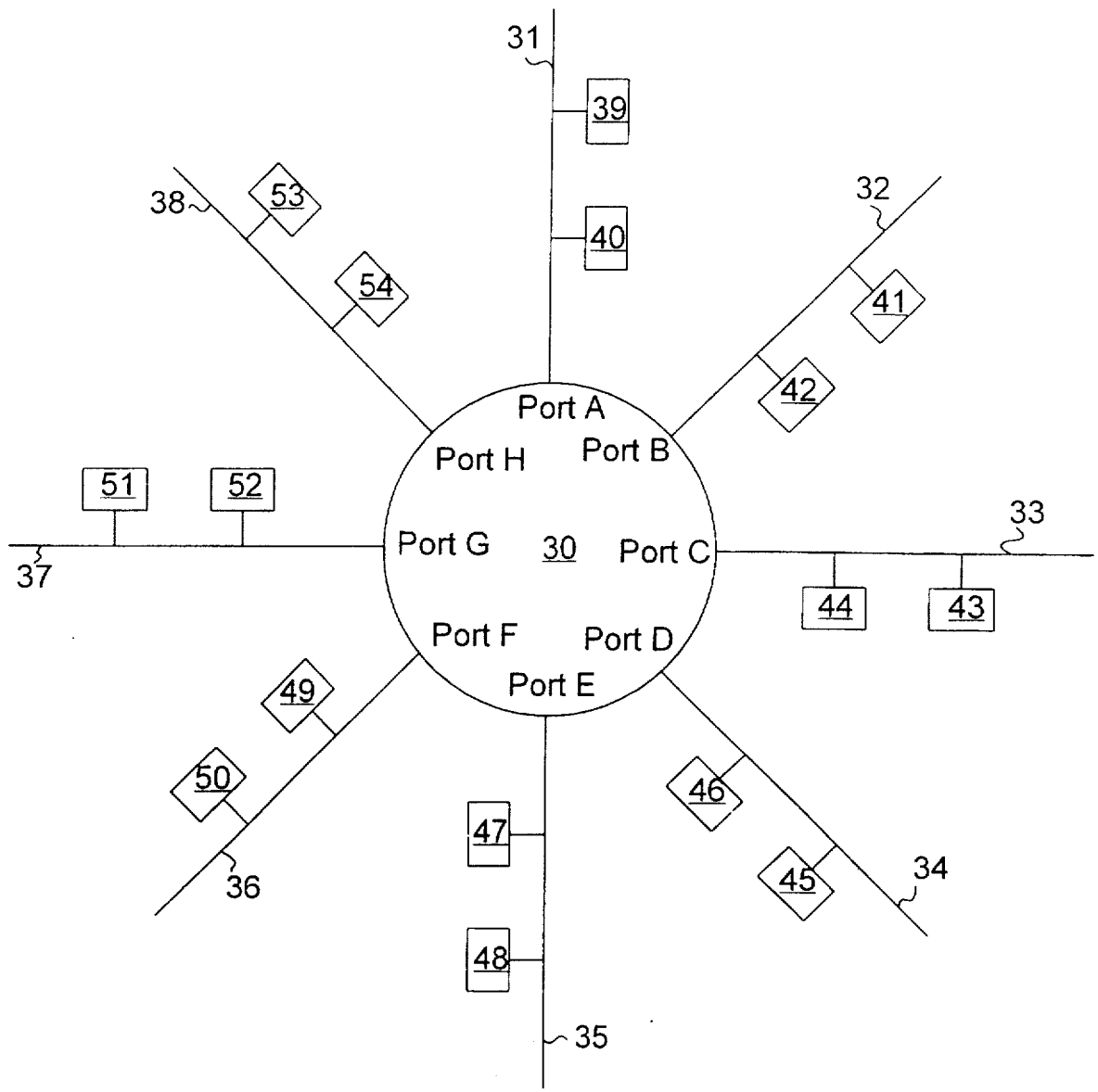

FIG. 9 illustrates a time chart according to the present invention for periodically updating the address and port data stored in each of the three look-up sub-tables #1–3 (204A–C). Assume that at time 0.0, the multi-port bridge 100 is first powered-up or reset such that there are initially no entries in any of the sub-tables #1–3 (204A–C) (e.g. a power-up or reset sequence sets each table entry to all zeros). During the first 2.5 minute time period, the source address included in each data packet appearing at any of the ports of the multi-port bridge 100 is hashed to 16 bits by removing the most significant 32 bits. An identification of the port (source port) which received the data packet is stored in a location of each of tables #1 (204A) and #2 (204B) designated by the hashed address.

Preferably, the 32 address bits which were removed during the hashing algorithm are also stored along with the port identification in the appropriate tables. These remaining 32 bits are used for verifying the complete address in the event that two or more nodes share hashed addresses (e.g. they have the same least significant 16 address bits). If an entry has already been made for a hashed source address in either table (based upon a packet originated by a first node), the remaining 32 source address bits of the packet are compared to the 32 bits stored in the memory location designated by the hashed source address. If the remaining 32 do not match, this indicates that the data packet originated from a second node having the same least significant bits as the first node. In such case, a linked list is formed for the affected table(s) for storing the remaining 32 bits of the address of the second node and the port identification for the port to which the second node is connected. If the remaining 32 bits match, this indicates that only one node (the first node) having the hashed source address has transmitted a data packet. In such case, linked lists are not required.

Also during the first 2.5 minute time period, the destination address included in each data packet received by the multi-port bridge 100 is hashed to sixteen bits. The memory controller 106 uses the hashed destination address to look-up in table #1 (204A) the appropriate port to which the data packet is to be directed for transmission to the destination node.

If no data is stored in the location designated by the hashed destination address, this indicates that the data packet is intended for a node that has not yet transmitted either a data packet or a "keep alive" packet. In such case, the multi-port bridge 100 does not have sufficient information to appropriately direct the packet. Therefore, the packet is preferably directed to every port except the port that received the packet (the packet is broadcast).

If data is stored in the location designated by the hashed destination address, the remaining destination address bits are compared to the 32 address bits stored in the that location to determine if they match. If there is not a match of the remaining address bits, this indicates that two or more nodes share the same 16 least significant address bits. When this occurs during a learning phase, a linked list is set up to store the port identification for each of the nodes which share the 16 least significant address bits. If there is a match of the remaining address bits, the identification of the port is utilized to appropriately direct the data packet to that port for transmission to the destination node.

If the port indicated by the destination address is the same as the port that received the packet, this indicates that the source node and destination node for the packet are in the same LAN segment. In such case, the multi-port bridge 100 preferably does not direct the packet to the port because the destination node receives the packet directly from the source node.

Upon the expiration of the first 2.5 minutes, sub-table #3 (204C) is cleared of all entries. The step of clearing the sub-table #3 can be skipped, however, if no entries have been made in sub-table #3 since start-up. Then, during the second 2.5 minute time period, data is stored in sub-tables #2 (204B) and #3 (204C) in the same manner that data was stored in sub-tables #1 (204A) and #2 (204B) during the first 2.5 minute time period. Also during the second 2.5 minute time period, table #2 (204B) is utilized for look-up cycles. Upon the expiration of the second 2.5 minutes, sub-table #1 (204A) is cleared of all entries. Then, during the third 2.5 minute time period, data is stored in sub-tables #1 (204A) and #3 (204C) while table #3 (204C) is utilized for look-up cycles. Upon the expiration of the third 2.5 minute time period, table #2 (204B) is cleared of all entries. During the fourth 2.5 minute time period, data is stored in sub-tables #1 (204A) and #2 (204B) while table #3 (204C) is utilized for look-up cycles. Upon expiration of the fourth 2.5 minute time period, sub-table #3 is cleared.

Note that the steps performed in the fourth time period are identical to the steps performed in the first time period (with the exception that it is not necessary to clear the sub-table #3 at the end of the first 2.5 minute time period). Thus, the process repeats by cycling through the steps of the first, second, and third time periods.

According to the invention, no entry utilized in any look-up cycle is more than 5 minutes old. However, the age of each entry is not individually tracked.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to one of ordinary skill in the art that the device of the present invention could be implemented in several different ways and the apparatus disclosed above is only illustrative of the preferred embodiment of the invention and is in no way a limitation.

What is claimed is:

1. A method of periodically updating entries in a look-up table for appropriately directing data packets through a multi-port bridge having a plurality of ports, each port having a port identification, wherein each of the data packets is originated by a respective one of a plurality of nodes, each node having a node address and each node corresponding to a respective one of the plurality of ports, the method comprising steps of:
   a. storing in a first memory store and in a second memory store the node address of each node which originates a data packet during a first period of time in association with the port identification of the corresponding port;
   b. storing in the second memory store and in a third memory store the node address of each node which originates a data packet during a second period of time in association with the port identification of the corresponding port; and
   c. storing in the first memory store and in the third memory store the node address of each node which originates a data packet during a third period of time in association with the port identification of the corresponding port.

2. The method according to claim 1 further comprising a step of utilizing the first memory store for directing data packets during the first period of time.

3. The method according to claim 2 further comprising a step of utilizing the second memory store for directing data packets during the second period of time.

4. The method according to claim 3 further comprising a step of utilizing the third memory store for directing data packets during the third period of time.

5. The method according to claim 2 wherein a product of the step of utilizing the first memory store for directing data packets is a triplet for each packet, each triplet having a first field containing the identification of the source port corresponding to the node which originated the packet, a second field containing an identification of a destination port which corresponds to a node that is an intended recipient for the packet, and a third field containing a starting address assigned to the packet in a packet buffer.

6. The method according to claim 1 wherein each data packet contains the address of the node which originated the data packet.

7. The method according to claim 1 further comprising a step of hashing each node address before storing the node address in each of the first, second and third memory stores.

8. The method according to claim 1 wherein the second period of time begins upon expiration of the first period of time.

9. The method according to claim 8 wherein the third period of time begins upon expiration of the second period of time.

10. The method according to claim 9 further comprising a step of clearing the first memory store upon expiration of the second period of time.

11. The method according to claim 10 further comprising a step of clearing the second memory store upon expiration of the third period of time.

12. The method according to claim 11 further comprising a step of clearing the third memory store upon expiration of the first period of time.

13. The method according to claim 12 further comprising steps of repeating steps a, b, c, and d, upon expiration of the third period of time.

14. An apparatus for periodically updating entries in a look-up table for appropriately directing data packets through a multi-port bridge having a plurality of ports, each port having a port identification, wherein each of the data packets is originated by a respective one of a plurality of nodes, each node having a node address and each node corresponding to a respective one of the plurality of ports, the apparatus comprising:
   a. a first memory store for storing the node address of each node which originates a data packet during a first period of time in association with the port identification of the corresponding port and the first memory store for storing the node address of each node which originates a data packet during a third period of time in association with the port identification of the corresponding port, wherein a second period of time occurs between the first period of time and the third period of time;
   b. a second memory store for storing the node address of each node which originates a data packet during the second period of time in association with the port identification of the corresponding port and the second memory store for storing the node address of each node which originates a data packet during the first period of time in association with the port identification of the corresponding port; and
   c. a third memory store for storing the node address of each node which originates a data packet during the third period of time in association with the port identification of the corresponding port and for storing the node address of each node which originates a data packet during the second period of time in association with the port identification of the corresponding port.

15. The apparatus according to claim 14 wherein each data packet contains the address of the node which originated the data packet.

16. The apparatus according to claim 14 wherein each node address is hashed before being stored.

17. The apparatus according to claim 14 wherein the first, second and third memory stores are each a CAM device.

18. The apparatus according to claim 14 wherein the first, second and third memory stores are each a RAM device which emulates a CAM device.

19. The apparatus according to claim 14 wherein the second memory store is cleared upon expiration of the third period of time.

20. The apparatus according to claim 19 wherein the third memory store is cleared upon expiration of the first period of time.

21. The apparatus according to claim 14 wherein the first memory store is utilized for directing packets through the multi-port bridge during the first period of time.

22. The apparatus according to claim 21 wherein a triplet is formed for each packet, each triplet having a first field containing the identification of the port corresponding to the node which originated the packet, a second field containing an identification of a port which corresponds to an intended recipient for the packet, and a third field containing a starting address assigned to the packet in a packet buffer.

23. The apparatus according to claim 21 further comprising a step of utilizing the second memory store for directing data packets during the second period of time.

24. The apparatus according to claim 23 further comprising a step of utilizing the third memory store for directing data packets during the third period of time.

25. An apparatus for periodically updating entries in a look-up table for appropriately directing data packets through a multi-port bridge having a plurality of ports, each port having a port identification, wherein each of the data packets is generated by a respective one of a plurality of nodes, each node having a node address and each node corresponding to a respective one of a plurality of ports of the multi-port bridge, the apparatus comprising:

a. a first memory store;
   b. a second memory store;
   c. a third memory store; and
   d. a control logic circuit coupled to each of the first, second and third memory stores, the control logic circuit for storing in the first memory store and in the second memory store the node address of each node which originates a data packet during a first period of time in association with the port identification of the corresponding port and for storing in the second memory store and in the third memory store the node address of each node which originates a data packet during a second period of time in association with the port identification of the corresponding port and for storing in the first memory store and in the third memory store the node address of each node which originates a data packet during a third period of time in association with the port identification of the corresponding port.

26. The apparatus according to claim 25 wherein each data packet contains the address of the node which generated the data packet.

27. The apparatus according to claim 25 wherein each node address is hashed before being stored.

28. The apparatus according to claim 25 wherein the first, second and third memory stores are each a CAM device.

29. The apparatus according to claim 25 wherein the first, second and third memory stores are each a RAM device which emulates a CAM device.

30. The apparatus according to claim 25 wherein the second period of time begins upon expiration of the first period of time.

31. The apparatus according to claim 30 wherein the third period of time begins upon expiration of the second period of time.

32. The apparatus according to claim 31 wherein the second memory store is cleared upon expiration of the third period of time.

33. The apparatus according to claim 32 wherein the third memory store is cleared upon expiration of the first period of time.

34. The apparatus according to claim 25 wherein the first memory store is utilized for directing packets through the multi-port bridge during the first period of time.

35. The apparatus according to claim 34 wherein a triplet is formed for each packet, each triplet having a first field containing the identification of the port corresponding to the node which originated the packet, a second field containing an identification of a port which corresponds to an intended recipient for the packet, and a third field containing a starting address assigned to the packet in a packet buffer.

36. The apparatus according to claim 34 wherein the second memory store is utilized for directing packets through the multi-port bridge during the second period of time.

37. The apparatus according to claim 36 wherein the second memory store is utilized for directing packets through the multi-port bridge during the second period of time.

* * * * *

UNITED STATES PATENT AND TRADEMARK OFFICE
CERTIFICATE OF CORRECTION

PATENT NO. : 5,940,597

DATED : August 17, 1999

INVENTOR(S) : David H. Chung

It is certified that error appears in the above-identified patent and that said Letters Patent is hereby correct as shown below:

On the Title Page:

Item [56] References Cited - U.S. PATENT DOCUMENTS
    For U.S. Patent No. 3,735,357, replace "Maholic" with --Maholick--; and
    Insert --

| | | | |
|---|---|---|---|
| 4,597,078 | 6/1986 | Kempf | 370/94 |
| 4,627,052 | 12/1986 | Hoare et al. | 370/88 |
| 4,706,081 | 11/1987 | Hart et al. | 340/825.03 |
| 4,707,827 | 11/1987 | Bione et al. | 370/85-- |

Item [56] References Cited - FOREIGN PATENT DOCUMENTS
    For European Patent Document No. 0597789A1, replace "5/1999" with --5/1994--; and
    Delete "

| | | | |
|---|---|---|---|
| 4,597,078 | 6/1986 | Kempf | 370/94 |
| 4,627,052 | 12/1986 | Hoare et al. | 370/88 |
| 4,706,081 | 11/1987 | Hart et al. | 340/825.03 |
| 4,707,827 | 11/1987 | Bione et al. | 370/85". |

Item [56] References Cited - OTHER PUBLICATIONS
    Insert --NEC Data Sheet, MOS Integrated Circuit μPD4516421,4516821,4516161 16M-bit Synchronous DRAM, Nov. 1995.--

UNITED STATES PATENT AND TRADEMARK OFFICE
CERTIFICATE OF CORRECTION

PATENT NO. : 5,940,597

DATED : August 17, 1999

INVENTOR(S) : David H. Chung

Figure 1:
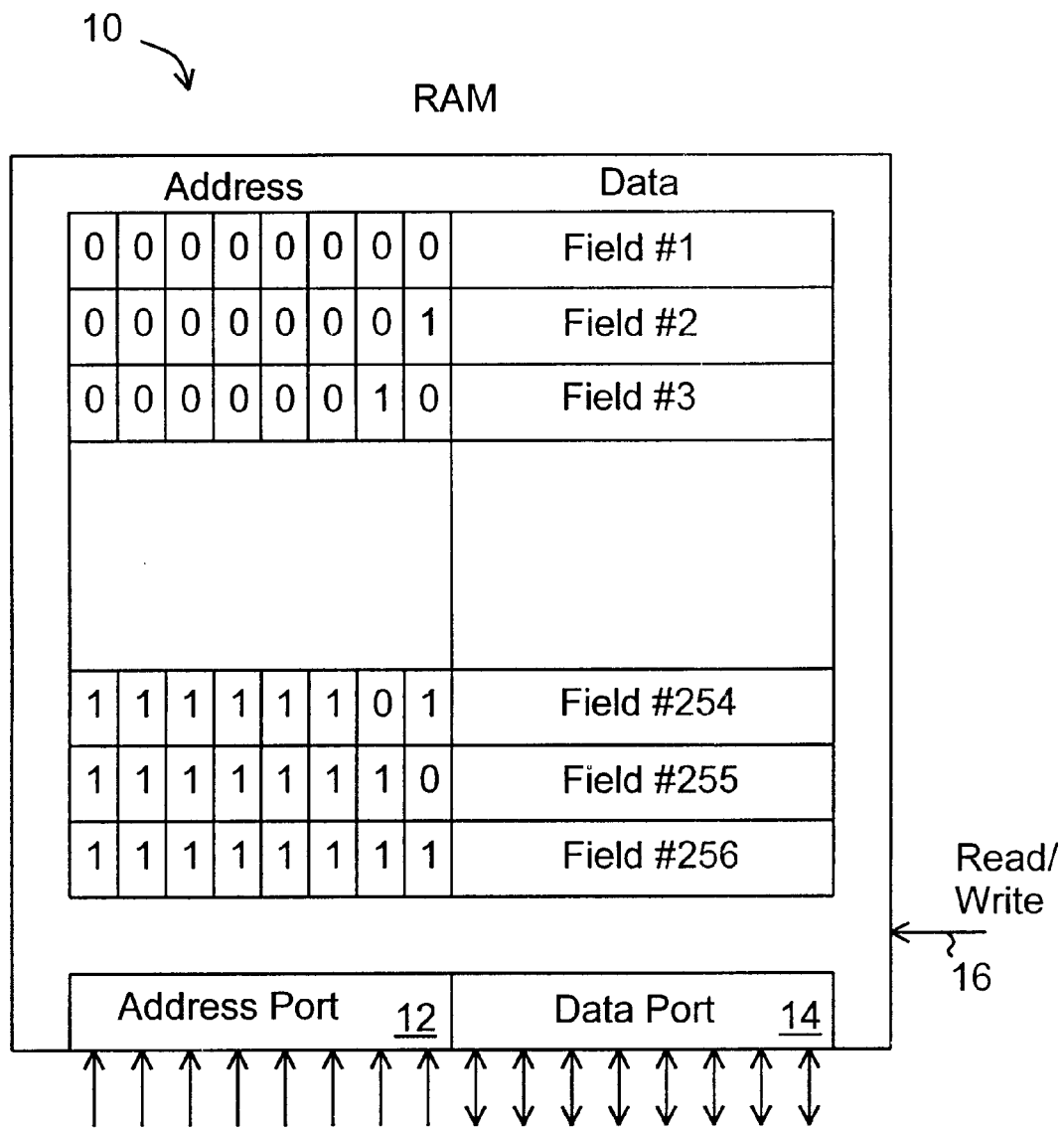
FIG. 1 illustrates a conventional random access memory (RAM) device.
Figure 2:
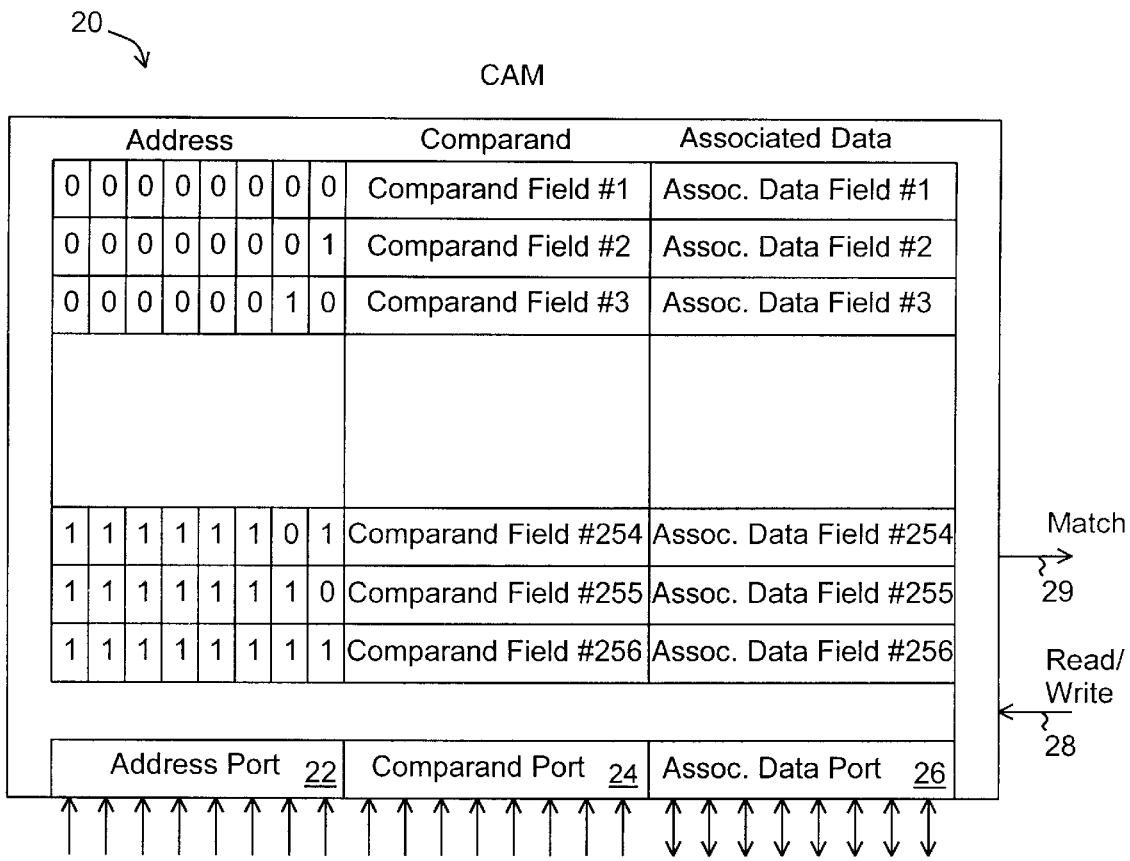
FIG. 2 illustrates a conventional content addressable memory (CAM) device.
Figure 3:
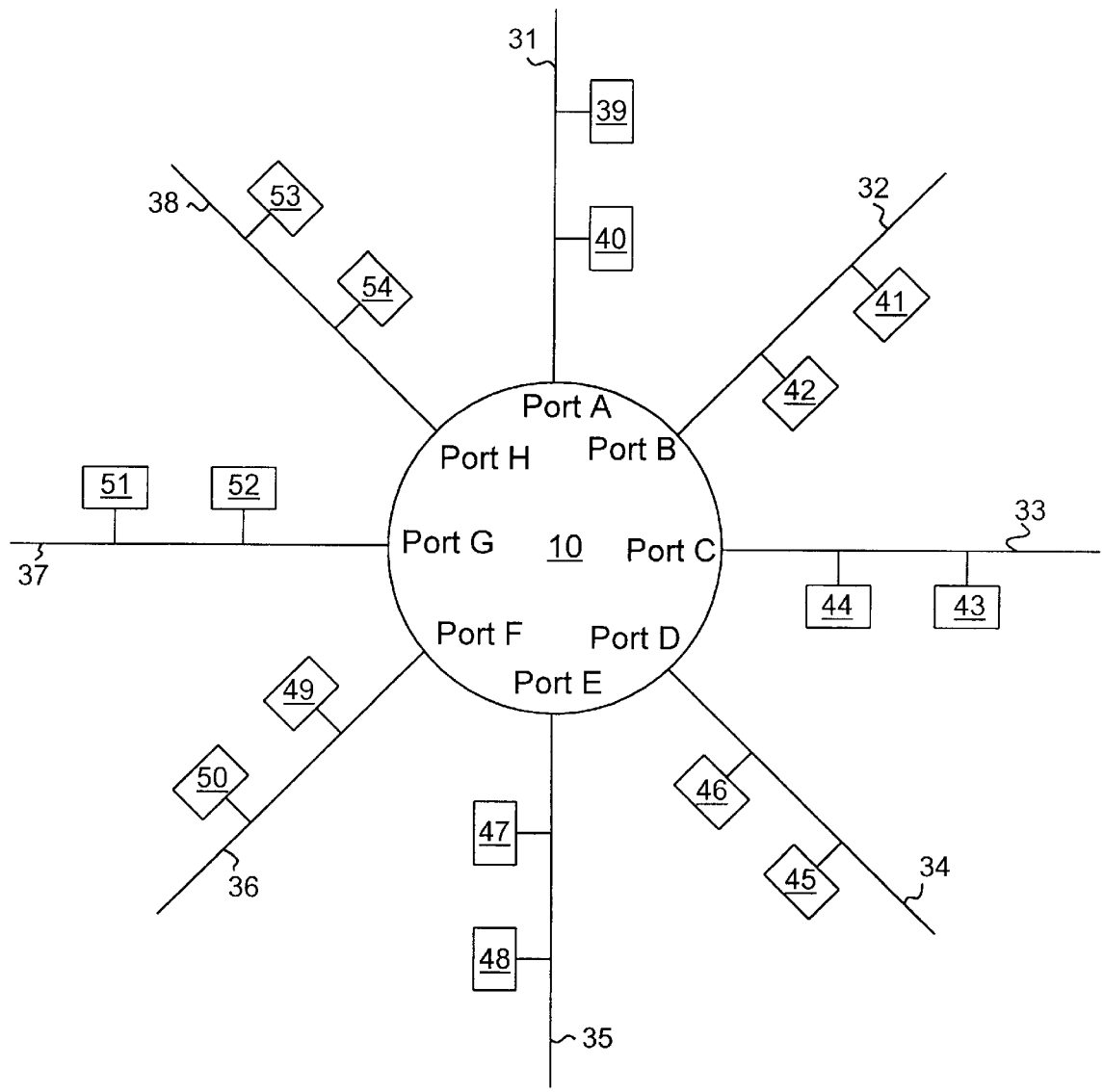
FIG. 3 illustrates a conventional local area network (LAN) including a multi-port bridge 30.
Figure 4:
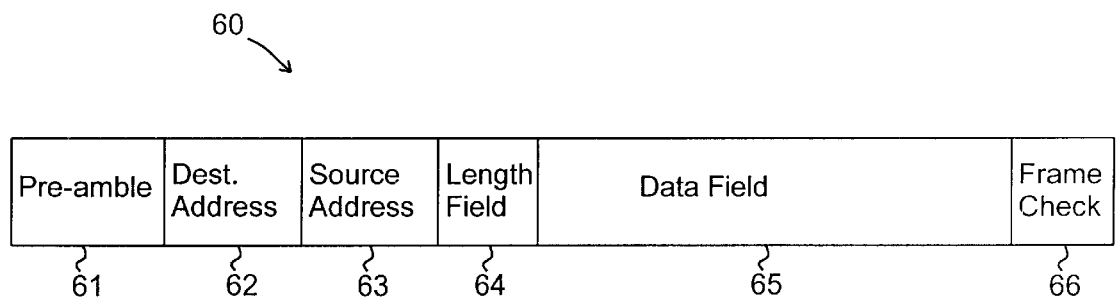
FIG. 4 illustrates a conventional IEEE 802.3 data packet.

It is certified that error appears in the above-identified patent and that said Letters Patent is hereby correct as shown below:

In the Drawings:

On sheet 3 of 9, Fig. 3, replace "10" with --30-- as shown in the attached corrected Fig. 3.

Figure 7:
FIG. 7 illustrates a "triplet" according to the present invention, including a first field containing an identification of a source port, a second field containing an identification of a destination port and a third field containing a memory address.

On sheet 7 of 9, Fig. 7, replace "400" with --500--, replace "402" with --502--, and replace "404" with --504--, as shown on the attached corrected Fig. 7.

In Col. 2, line 46, replace "#A-F" with --#A-H--; and on line 47, replace "#A-F" with --#A-H--.

In Col. 3, line 58, insert a period --.-- between "address" and "The node".

In Col. 4, line 4, insert --)-- between "bits" and "long"; and on line 51, insert --a-- between "than" and "predetermined".

In Col. 9, line 9, replace "Fig. 5" with --Fig. 7--.

In Col. 12, line 16, delete "the" between "in" and "that".

Triplet

| Source Port Identification 500 | Dest. Port Identification 502 | Memory Address 504 |
|---|---|---|